United States Patent

Müller

[11] 3,986,086

[45] Oct. 12, 1976

[54] CONTROL CIRCUIT FOR BRUSHLESS D-C MOTOR

[75] Inventor: Rolf Müller, Sankt Goergen, Black Forest, Germany

[73] Assignee: Papst-Motoren KG, Sankt Georgen, Black Forest, Germany

[22] Filed: Nov. 26, 1974

[21] Appl. No.: 527,345

Related U.S. Application Data

[62] Division of Ser. No. 363,290, May 23, 1973, Pat. No. 3,873,897.

[30] Foreign Application Priority Data

Oct. 27, 1972 Germany............................ 2252727

[52] U.S. Cl. ................................. 318/138; 318/254
[51] Int. Cl.² ......................................... H02K 29/00
[58] Field of Search ......................... 318/138, 254

[56] References Cited
UNITED STATES PATENTS

| | | | |
|---|---|---|---|
| 3,304,481 | 2/1967 | Saussele | 318/138 |
| 3,611,081 | 10/1971 | Watson | 318/138 |
| 3,873,897 | 3/1975 | Muller | 318/138 |

*Primary Examiner*—Gene Z. Rubinson
*Attorney, Agent, or Firm*—Flynn & Frishauf

[57] ABSTRACT

Control semi-conductor switches, such as switching transistors, are connected to the armature windings of the rotor, which has a permanent magnet rotor; the semi-conductor switches are energized by pulses derived from the control circuit, which includes a sensing circuit, such as diodes connected to the armature windings, to sense induce d-c voltages in the state of winding during operation of the motor, and a phase shift circuit, such as a multi-stage filter, phase shifting the sensed d-c voltages by, preferably about 180°-electrical, the phase shifted signals then being used to control the timing of energization of the semiconductor switches, for example by comparison of instantaneous values of the phase shifted d-c voltages with respect to a reference, so that the maximum current flow, due to pulse energization, will occur at the time of maximum induced voltages, and for a period of time depending on the relative instantaneous value of the phase shifted d-c voltage with respect to a reference voltage, resulting in optimum efficiency of operation of the motor.

11 Claims, 4 Drawing Figures

CONTROL CIRCUIT FOR BRUSHLESS D-C MOTOR

This application is a division of Application Ser. No. 363,290, filed May 23, 1973, now U.S. Pat. No. 3,873,897.

The present invention relates to a control system and circuit for a direct brushless current (d-c) motor having a permanent magnet rotor which operates in an air gap and in which the motor winding is intermittently energized to generate a torque; and more particularly, to a speed control circuit for such a motor in which the air gap is non-uniform over its circumferential extent so that the electrodynamic torque, in addition to causing rotor rotation, permits storage of energy in the magnetic circuit which is released to the rotor when the winding has been de-energized to provide, overall, a more uniform output torque than heretofore possible.

Brushless d-c motors have been previously proposed. In one proposed construction, four separately controlled windings are provided in order to generate a rotating field (see: "Siemens-Zeitschrift" 1966, pages 690–693). For brushless operation, two Hall generators and at least four power transistors are needed.

Brushless d-c motors can readily be combined with control circuits which provide speed regulation. To improve efficiency, to obtain smooth operation, and vibration-free running, current should be supplied to the windings preferably only roughly in that time range, that is, when there is a displacement by about 90° el. (hereinafter: "°-el.") between stator and rotor pole — which means that current will flow only during a relatively short period of time during any rotor revolution. Thus, the gaps in torque derived from the power applied to the motor are substantial. If such speed regulation is desired, then current through the windings must be accurately controlled and be applied exactly at that time when the voltages induced in the windings by the permanent magnet rotor have a maximum, that is, when stator and rotor poles are displaced by roughly 90 electrical degrees.

It is an object of the present invention to provide a control system for a brushless d-c motor which is simple, requires few expensive components and which effects reliable control and, also to a speed control circuit adapted for operation with and which provides for relatively uniform torque at the output of the motor, in spite of substantial gaps in power applied to the winding when operating at the desired speed.

SUBJECT MATTER OF THE PRESENT INVENTION

Briefly, the circuit includes a sensing branch connected to the motor windings to sense induced a-c voltages in the armature windings of the motor due to rotation of the permanent magnet rotor; the sensed a-c voltages are then phase shifted, preferably by about 180°-el., e.g. a multi-stage filter, and the phase shifted voltages are utilized to control the duration of energization of the motor windings, for example by comparing the phase shifted voltages.

The invention will be described by way of example with reference to the accompanying drawings, wherein.

Figure 1:
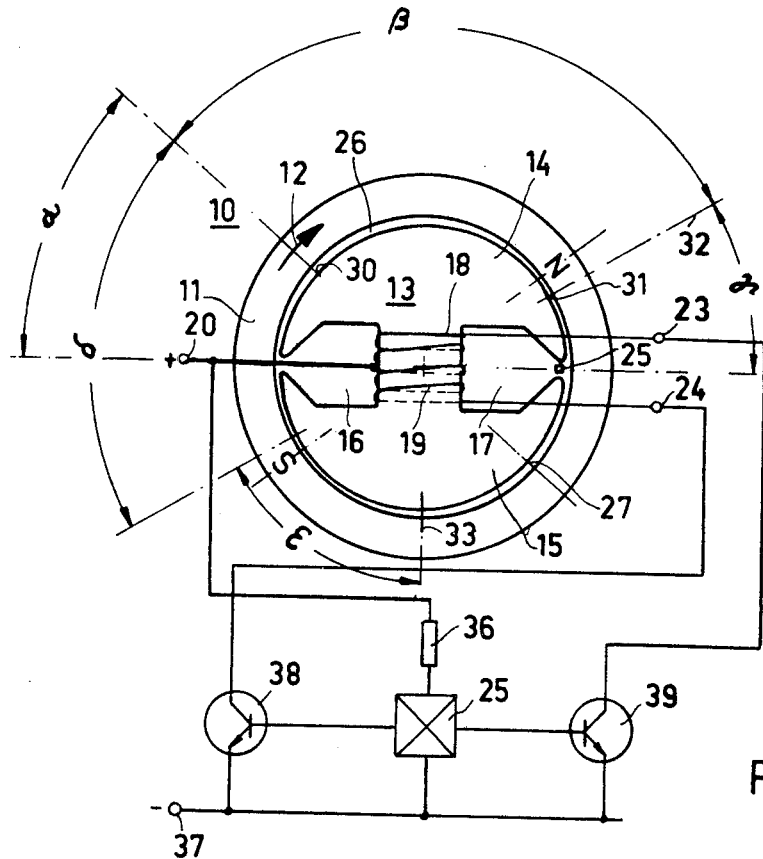
FIG. 1 is a schematic cross-sectional view of a two-pole external rotor motor, and associated circuitry.

The external rotor motor 10 of FIG. 1 has an outer permanent magnetic two-pole rotor 11, which is magnetized to have an approximately sinusoidal, or trapeze-shaped magnetic field distribution. In operation, the motor rotates in direction of arrow 12. Rotor 11 is shown in its quiescent or stop position, which is also its starting position, determined essentially by the geometry of the magnetic circuit.

Stator 13 of motor 10 is a salient pole double-T armature, having an upper pole 14 and a lower pole 15, both extended circumferentially over an extended arc or sector, covering almost an entire semi-circle. The armature is formed with two slots 16, 17 in which a single winding is placed formed of two winding halves 18, 19, with a center tap connected to positive terminal 20. The free ends of the winding halves 18, 19 are shown at terminals 23, 24. A Hall generator, or any equivalent galvanomagnetic commutation element or sensor is located at the edge of the slot 17, or at any electrically equivalent position of the stator 13.

The stator and rotor are separated by an air gap. The air gap portion 26 above the pole 14, and the air gap 27 opposite pole 15 are, in accordance with the invention of U.S. Pat. No. 3,873,897, shaped in a specific manner. In accordance with that invention, the effective air gap is varied, so that the various angular or arcuate positions have a specific air gap size. This effective air gap can be formed at the various angular position, for example by stator laminations of non-uniform, or uneven diameter in such a way that the effective average air gap, at any angular position, its dimensioned in accordance with the principle of the present invention.

Figure 2:
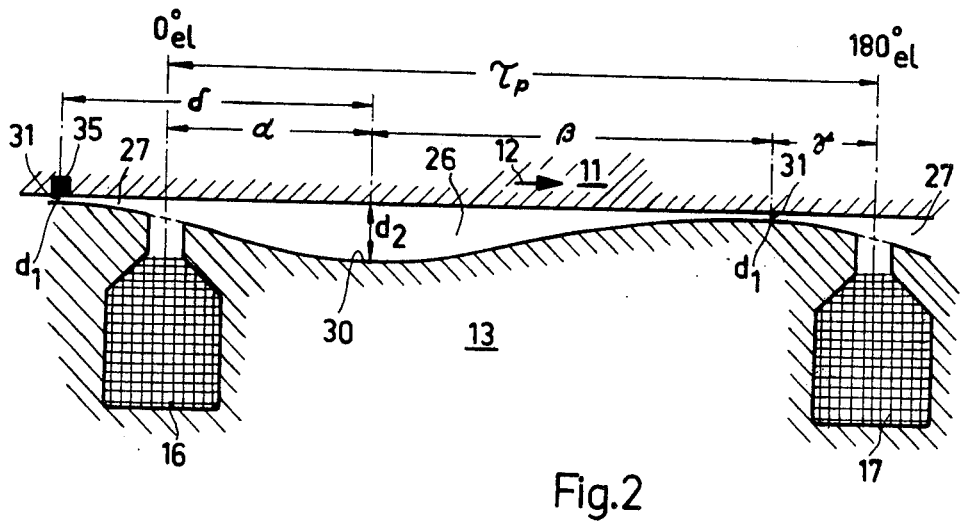
FIG. 2 is a highly schematic developed view of the air gap of the upper pole arc, or sector, of the motor of FIG. 1.

The air gap 26 is shown, developed, in FIG. 2. It is symmetrical with air gap 27. Rotor 11 and stator 13 are also illustrated — developed — in FIG. 2, the arc of the stator covering 180°-el. Starting from winding slot 16, air gap 26 increases over a first angular range $\alpha$, extending, for example from 10° to 100°-el. It increases essentially uniformly to a position 30, at which point the maximum value $d_2$ of air gap 27 is reached. Air gap 26 then decreases over a second angular range $\beta$, extending for example 80°-el. to 160°-el., decreasing uniformly, or non-linearly to a position 31 at which the minimum value $d_1$ of the air gap 26 will appear. Position 31 is located by an angle $\gamma$ in advance of slot 17. This angle $\gamma$ may have from zero to 50°-el. If $\gamma$ equals zero, then the relatively great decrease in induction directly above the opening of slot 16, or 17, respectively, can be compensated in part. The position of minimum air gap 31 may, therefore, be placed directly in advance of the slot 17, so that the angle $\gamma = 0$.

Starting at position 31, the air gap then increases (it will become air gap 27) uniformly — except for the interruption due to the slot 17 — over a fourth angular range $\delta$, extending for example from 20°-el. to 100°-el., increasing monotonously, or uniformly to point 30 opposite the adjacent pole. Stator 13, in cross section, will have roughly the form of an ellipse, the main axis 32 of which is offset by an angle $\epsilon$, which is approximately 40°-el. to 80°-el. with respect to the axis 33 passing through the center line of the two poles 14, 15.

Operation: Let it be assumed that the stator 13 is an ideal magnetic circuit, that is, does not have the interruptions due to slots 16, 17; let it further be assumed that, at a given position, for example at point 35, a concentrated magnetic pole such as the north pole is placed. This concentrated pole 35 will assume the position shown in FIG. 2, when in quiescent or steady state position, that is, at the point at which the opposed air gap is a minimum, that is, at position 31 of the air gap. To turn the pole 35 in direction of arrow 12 requires energy, since the air gap opposite pole 35 increases. This torque is generated by current in the winding 18, or 19, respectively, in operation, approximately over the angular range δ.

After pole 35 has passed the position 30, that is, maximum air gap of dimension $d_2$, the rotor 11 is then driven by the reluctance torque and the energy stored in the magnetic circuit is released or delivered, so that no electrical torque needed be provided during this portion of rotation of the rotor. This condition will pertain until position 31 at the next pole is reached, at which point the cycle will repeat. In actual practice, the magnetic pole 35 is not concentrated, but rather, the two poles of the rotor 11 will have a linear extent. They may be magnetized according to a square wave, trapeze-shaped, or sinusoidal (with respect to circumferential extent). A trapezoidal magnetization is preferred. Due to the length of magnetization, the reluctance torque will not be delivered in accordance with the shape of the air gap. For purposes of explanation, the two magnetic poles of the rotor 11 may, however, be considered to consist of various highly concentrated magnetic poles distributed around a rotor circumference. The actual torque distribution is obtained by superimposing the torques generated by these concentrated poles at any time, which torque is determined by the type of magnetization of the rotor as well as by the shape of the air gap and its linear width, with respect to arcuate extent. In actual practice, the angles $\alpha$ to $\delta$, as well as the dimensions $d_1$ and $d_2$ are best determined by simple experimentation. Suitable values for the various angles have been given above.

Current in windings 18 and 19 is controlled, in dependence on the position of the pole of rotor 11, by a Hall generator 25. Its control terminal is connected over a resistor 36 with positive terminal 20; its other terminal is connected to negative bus 37 of a direct current source, for example of 24 V. The two outputs of the Hall generator 25 are connected with the bases of a pair of npn transistors 38, 39, the emitter of which is connected to negative bus 37, whereas the collector of the transistor 38 connects with terminal 24 of the winding 19, and the collector of transistor 39 connects with the terminal 23 of winding 18. As the poles of rotor 11 pass the Hall generator 25, the one or the other transistor is gated to conduction during a predetermined angular range. The Hall generator 25 effects commutation, in the circuit of FIG. 1, between time periods 0°-el., 180°-el., 360°-el., etc. Current in one transistor (for example 38) is turned off when the current in the other transistor (e.g. 39) it turned on. The effective angle during which current flows in one of the two transistors, actually, is less than 180°-el. due to the commutation switching time, and is, for example 160°-el. At the commutation instant, a small gap in torque will result.

The explanation in connection with FIG. 2, assumed a concentrated pole. In actual practice a magnet having trapezoidal magnetization is preferred. In that case the magnetic effects are caused primarily by the regions between two adjacent rotor poles (G in FIG. 2), i.e. by the pole gaps. When the air gap decreases under the pole gap G, a braking reluctance torque is applied to the motor shaft, and magnetic energy is stored; when the air gap increases under a pole gap G, this driving reluctance torque is applied to the rotor shaft and stored energy is released. While the description given in connection with FIG. 2 has been given under the assumption of a concentrated magnetic pole 31, (because this will greatly assist in understanding the principles of the present invention) it should be noted that in the case of trapezoidal magnetization there actually exists what might be termed a "concentrated magnetic gap" $g$. Referring to FIG. 2, it will thus be seen that in a motor having trapezoidal magnetization the angle $\beta$ (decreasing gap) will essentially determine the extent of the braking reluctance torque, and the angle $\delta$ (increasing gap) will essentially determine the extent of the driving reluctance torque.

An uncontrolled network, as illustrated in FIG. 1, will have a turn-on angle for the transistors 38, 39, which is relatively large, for example about 160°-el. For speed motor control and efficiency it is desirable to make this angle smaller and to permit current to flow in the windings 18, 19 only during the relatively short duration of travel through a smaller angle, for example 120°-el. or less. If current flows only during a shorter angular range, the reluctance torque must be effective over a relatively large angular range, in order to completely fill the gap in the electromagnetic drive torque.

The actual structure of motors, in accordance with the present invention as described in the foregoing example, particularly the values of the angles $\beta$ and $\delta$ have to be specifically matched to this case. These motors, if operated in accordance with the circuit of FIG. 1, should have a small angle $\delta$ and a relatively large angle $\beta$, if the rotor poles have trapezoidal magnetization. In contrast, motors adapted for operation with a speed control circuit of the type described in connection with FIG. 3 should have a relatively large angle $\delta$ and a relatively small angle $\beta$, for optimum results.

Figure 3:
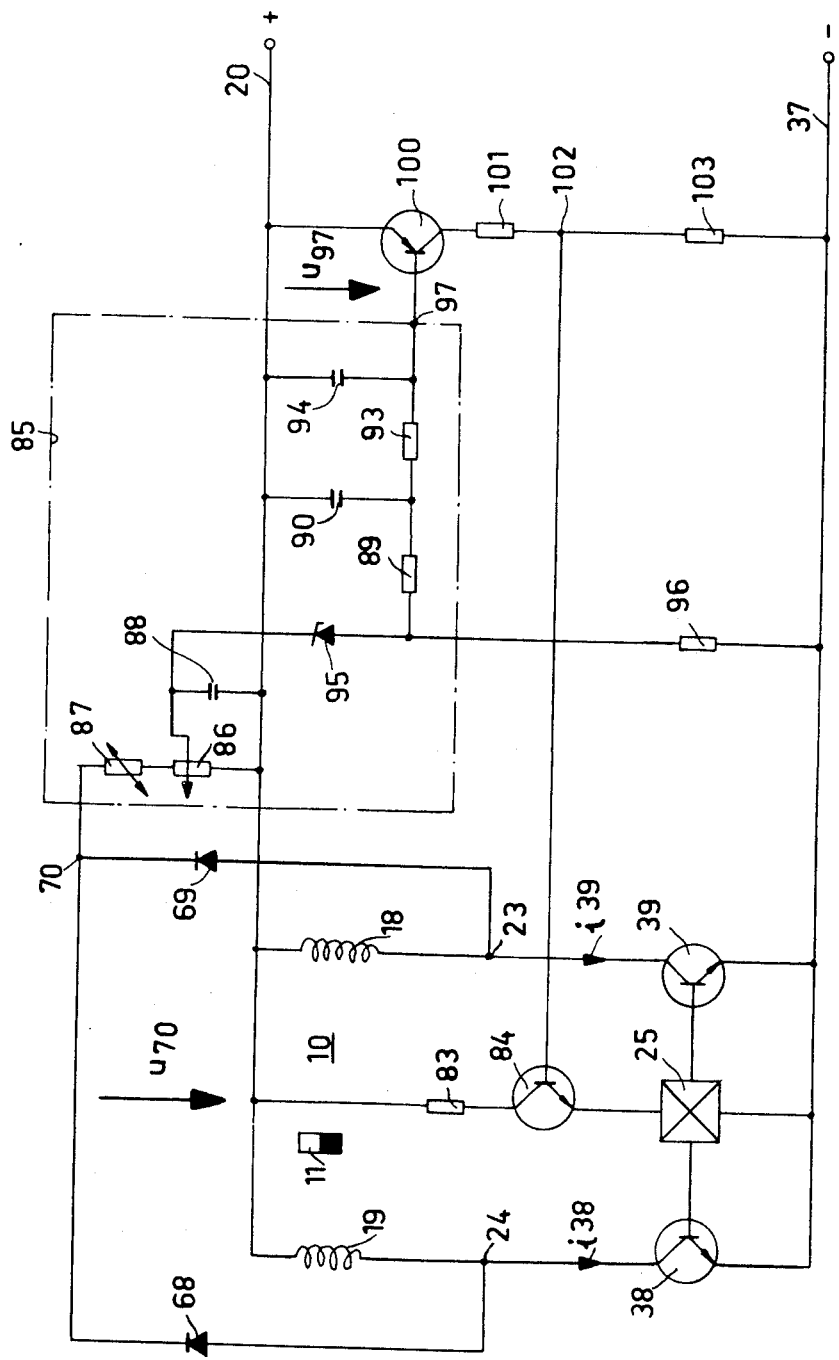
FIG. 3 is a schematic circuit diagram of the control circuit speed of the present invention, applied to control operating of the motor of FIG. 1.
Figure 4:
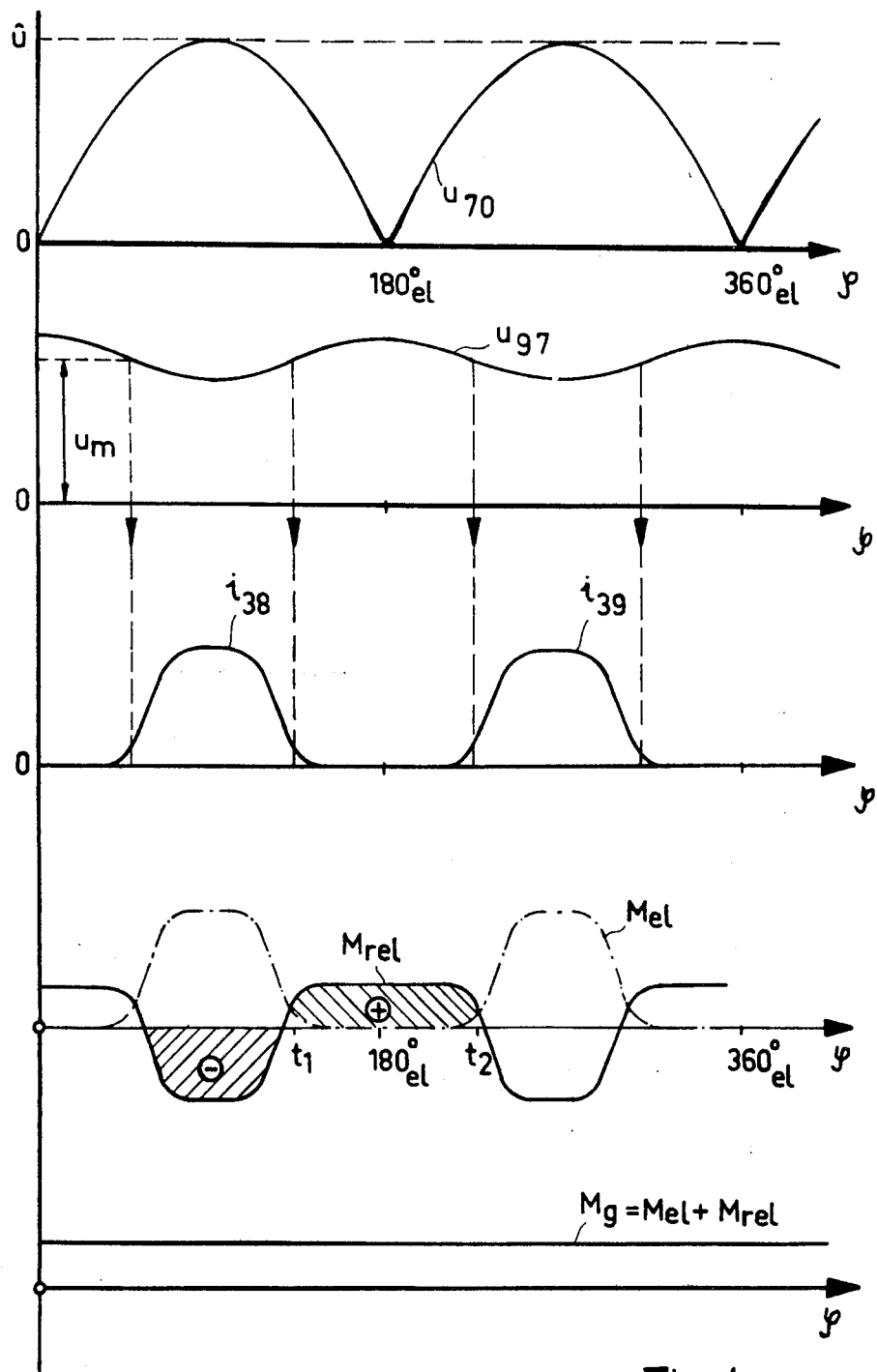
FIG. 4 shows a plurality of graphs, taken with respect to angular rotor displacement on the abscissa.

FIG. 3 illustrates a control circuit in accordance with the present invention. Terminals 23, 24 of the two windings 18, 19 are connected to two diodes 69, 68, respectively, the cathodes of which are connected to a common line 70. In operation, a half-wave rectified voltage $u_{70}$ will be obtained, having an amplitude representative of the speed of rotor 11 (FIG. 4, graph $a$).

Resistor 36 (FIG. 1) is replaced by resistor 83, connected in series with the emitter-collector path of a transistor 84.

Voltage $u_{70}$ is connected to a phase shift network 85, which is in form of a filter network. The input to circuit 85 is a voltage divider formed of a resistor 87 and a potentiometer 86. Resistor 87 is a negative temperature coefficient resistor, included in the circuit to compensate for the temperature dependent remanent induction of the rotor 11. This induction decreases with increasing temperature.

The phase shift filter 85 has three series connected R-C circuits, formed of resistors 86, 87, 89, 93, and capacitors 88, 90, 94. A Zener diode 95 is placed between capacitor 88 and capacitor 90. The anode of Zener diode 95 is connected to negative line 37 over a resistor 96. The Zener diode shhifts the voltage at bus 70 in negative direction by a fixed value. The normal voltage of line 70, in operation, is more positive than the voltage of the positive bus 20. The voltage at the anode of the Zener diode 95 will thus be less than the voltage of line 20. The filter and phase shifting network 85 has a dual effect; for one, a phase shift of the phase of the voltage $u_{70}$ (FIG. 4, graph $a$) by about 180° will be effected. It has been observed that the capacitors may have a substantial tolerance. Additionally, the highly wavy voltage $u_{70}$ is damped or smoothed, so that at output 97 a voltage $u_{97}$ (FIG. 4, graph $b$) is obtained. The value and phase position of voltage $u_{97}$ is determined by the values of the components of the filter and phase shift network 85.

Voltage $u_{97}$ is applied to the base of a pnp transistor 100, the emitter of which is connected to positive line 20. Its collector is connected over a resistor 101 with a junction 102, from which a resistor 103 connects to negative line 37. Junction 102 is connected to the base of transistor 84.

If point 97 becomes more negative than positive line 20, transistor 100 and with it the connected npn transistor 84 becomes conductive. Since the voltage $u_{97}$ will be only slightly wavy, the turn-on and turn-off switching can be very soft, resulting in current flow through windings 18, 19 formed by current $i_{38}$, $i_{39}$, respectively, as illustrated in graph FIG. 4, line $c$. The motor will thus operate quietly, with little switching transients or interferences upon connection and disconnection of current through the windings, and little disconnecting peaks. The efficiency is excellent, since the windings, as can be seen from the graph, will receive current when the induced voltage is a maximum. Suitable dimensioning of the filter and phase shift network 85 can be used to make the switching change-over of transistors 38, 39 more rapid in order to decrease losses in the transistors 38, 39.

Operation of circuit of FIG. 3: If the speed of motor 10 is below a desired value, as commanded by the setting of the potentiometer 86, then the induced voltage $u_{70}$ will have a relatively smaller amplitude. The d-c voltage portion of the smooth, phase-shifted voltage $u_{97}$, illustrated at $u_m$ in FIG. 4, graph $b$, will be relatively small, so that transistor 100 will receive at its base a voltage which is more negative than the voltage of line 10 almost for the entire time period. Transistor 100, and therefore transistor 84 are constantly, or almost constantly conductive so that the armature current will switch between winding halves 18, 19, as discussed above in connection with FIG. 1, essentially under control of Hall generator 25. When the desired speed of the motor is reached, then the d-c voltage portion $u_m$ will increase so that the base of transistor 100 will, during some period of time, become more positive than its emitter. During this period both transistors 100 and 84 will be blocked, and Hall generator 25 cannot deliver a Hall voltage, so that transistors 38, 39 will likewise remain blocked. When the voltage $u_{97}$, due to the remaining waviness, drops so that te base of the transistor 100 will be negative relative to its emitter, transistor 100 will become conductive, causing conduction of transistor 84, so that Hall genereator 25 will be energized and, in dependence on the then existing magnetic field of rotor 11, either transistor 38 or transistor 39 will be conductive. The current curves will result which are seen in FIG. 4, graph $c$. Hall generator 25 thus acts, effectively, like an AND-gate; it logically interconnects the information determined by the direction of magnetic flux from rotor 11 with the information derived from transistor 100. Commutation of current from transistor 38 to transistor 39, and vice versa, will therefore — at controlled speed — occur no longer at periods of time 0°-el., 180°-el., 360°-el., etc. (FIG. 4). Rather, current $i_{38}$ will terminate at approximately 140°-el., and current 39 will begin only at about 220°-el., since at 140°-el., the current supply to Hall generator 25 was interrupted by the controller, the current supply being connected only at about 220°-el. Thus, the Hall generator alone no longer controls the commutating time, as in FIG. 1.

If the speed increases further, transistors 100 and 84 are practially constantly blocked, and motor 10 will receive little or no electromagnetic energy, so that its speed will again decrease.

The control in accordance with the present invention influences the width, or the intensity of the current pulses. The dynamics of control are excellent and the motor is controlled rapidly, without hunting, and without overshoots. The efficiency is also excellent, since the current pulses in windings 18 and 19 will have the correct phase position with respect to induced voltage $u_{70}$, and are relatively short, e. g. approximately 120°-el.

Currents $_{38}$ and $i_{39}$, flowing in the windings 19, 18, respectively, cause an electromagnetic torque $M_{el}$, as seen in FIG. 4, graph $d$ in chain-dotted lines. This torque, as can be seen is interrupted by substantial gaps. These gaps are filled by the reluctance torque $M_{rel}$, generated as above described, as shown in FIG. 4, graph $d$. The illustrated and described shape of the air gap will have the effect that the torques $M_{el}$ and $M_{rel}$ are roughly the mirror images of each other, so that the reluctance torque falls in the gaps of the electromagnetic torque $M_{el}$, that is, between time periods $t_1$ and $t_2$ (FIG. 4 – $d$), to provide an overall output torque which is effectively constant. This is important since a practically constant torque to the motor is then obtained over an entire full rotation of the rotor. If the two torques $M_{el}$ and $M_{rel}$ are added, the total overall torque $M_g$ is obtained, see graph FIG. 4 – $e$. This torque, by suitable dimensioning of the air gap and of the control of the current through the windings can essentially constant. This overall torque can be pre-set for the motor, that is, a motor of the type can be used to drive apparatus which requires an essentially even output, that is, it may be used, for example for a fan, ventilator, a printer, as drive motor for tape recorders, record changers and turntables and the like. As seen in FIG. 3, the speed control for a motor of this type requires but little in the say of components, and is simple to construct and assemble.

Various changes and modifications may be made within the scope of the inventive concept.

I claim:

1. Control circuit to control the operation of a brushless d-c motor having a stator (13, 14, 15), a permanent magnet rotor (11) and
    winding means (18, 19) on the stator to generate an electromagnetic field when energized, comprising
    controlled semiconductor switching means (38, 39) controlling pulse current flow through the winding means;
    rotor position sensing means (25) synchronizing pulse energization of the semiconductor switching means and hence of the winding means with the angular position of the rotor to generate, electrodynamically, an interrupted, pulsed electromagnetic torque during such pulse energization of the winding by interaction of the magnet of the rotor with the electromagnetic field due to energization of the winding means, soft ferromagnetic means arranged on said stator for producing, in operation, a reluctance torque ($M_{rel}$) by interaction between said soft ferromagnetic means and said permanent magnet rotor, said reluctance torque driving said rotor during the pulse intervals of said pulsed electromagnetic torque;

means (68, 69) sensing induced a-c voltages ($u_{70}$) in the stator winding means (18, 19) during operation of the motor;

means (85) phase-shifting the sensed a-c voltages to derive a phase shifted voltage $u_{97}$);

and means (100, 84) deriving a control signal to energize the semiconductor switching means (38, 39) in dependence on a characteristic parameter of the phase-shifted voltage ($u_{97}$).

2. Control circuit according to claim 1, wherein the phase-shift means (85) comprises means shifting the phase of the induced a-c voltages by about 180°-electrical.

3. Control circuit according to claim 1, wherein the phase-shift means (85) comprises a multi-stage filter.

4. Control circuit according to claim 3, wherein the multistage filter comprises a plurality of series-connected R-C circuits.

5. Control circuit according to claim 1, further comprising
voltage reference means (95) and wherein said characteristics comprise a comparison of amplitude of the phase-shifted voltage with respect to the reference means.

6. Control circuit according to claim 1, wherein the phase-shift means comprises a multi-stage filter (85) and a control amplifier connected thereto.

7. Control circuit according to claim 1, further comprising a temperature sensitive element (87) included in the control circuit, said temperature sensitive element being dimensioned to compensate for temperature dependency of remanent induction of the permanent magnetic rotor.

8. Control circuit according to claim 1, wherein the means sensing the induced voltage comprises a multiphase half-wave rectifier (68, 69).

9. Control circuit according to claim 1, wherein the stator includes ferromagnetic material; the motor has an air gap separating the rotor and stator, the air gap having a first zone of increasing width, and hence increasing reluctance of the magnetic circuit, and a further zone of decreasing width, and hence decreasing reluctance of the magnetic circuit, the ferromagnetic material in said zone of decreasing width forming said ferromagnetic means, to store a portion of the generated electrodynamic torque during pulse energization in form of magnetic reluctance torque by interaction of the magnet of the rotor with the magnetic structure of the stator when the magnet of the rotor is in an angular range which includes at least part of said zone of increasing width of the air gap, the reluctance torques stored in magnetic form being released to the rotor during pulse gaps, or interruptions in generated electrodynamic field by interaction of the magnet of the rotor with the magnet structure of the stator when the magnet of the rotor is in an angular range which includes at least part of said zone of decreasing width of the air gap, the alternating component of the electrodynamically generated torque and the magnetic reluctance torque being in phase opposition and, together, providing a net driving torque to the rotor upon rotation with respect to the stator.

10. Control circuit according to claim 9 in combination with a motor in which the magnetization of the permanent magnet motor is approximately trapeze-shaped with magnetization gaps (G) between the zones of magnetization;

and wherein the angular range of rotor rotation during which the windings are energized, under control of said control singnal occurs in that angular range ($\beta$) in which the pole gaps (G) in operation of the motor, pass through a zone of decreasing widths of the air gap, with respect to the direction of rotation of motor, and wherein the angular range of rotor rotation in which the windings on the stator are not energized so that there will be a gap in the electro-dynamic torque, approximately coincides with that angular range ($\delta$) in which the width of the air gap, with respect to direction of rotation of the rotor, is increasing (27).

11. Control circuit according to claim 1, wherin said control circuit is a speed control circuit and further comprises voltage reference means (95) having a value representative of a given speed, and wherein said characteristics comprise a comparison of amplitude of the phase-shifted voltage with respect to the reference means.

* * * * *